United States Patent [19]
Arai et al.

[11] Patent Number: 5,307,687
[45] Date of Patent: May 3, 1994

[54] ELECTROMAGNETIC FLOWMETER

[75] Inventors: Masatsugu Arai; Akiomi Kohno; Kazuaki Yokoi; Yuuji Yoshitomi, all of Ibaraki; Yutaka Sakurai; Tamio Ishihara, both of Katsuta, all of Japan

[73] Assignee: Hitachi, Ltd., Tokyo, Japan

[21] Appl. No.: 890,245

[22] Filed: May 29, 1992

[30] Foreign Application Priority Data

May 30, 1991 [JP] Japan .................................. 3-127065

[51] Int. Cl.$^5$ ............................................... G01F 1/58
[52] U.S. Cl. .............................. 73/861.12; 73/861.08
[58] Field of Search ......................... 73/861.12, 861.08

[56] References Cited

U.S. PATENT DOCUMENTS

| 4,507,975 | 4/1985 | Bittner et al. | 73/861.12 |
| 4,722,231 | 2/1988 | Tanaka et al. | 73/861.12 |
| 4,912,838 | 4/1990 | Goto et al. | 73/861.12 |

FOREIGN PATENT DOCUMENTS

| 113928 | of 0000 | European Pat. Off. . |
| 120145 | 2/1983 | European Pat. Off. . |
| 3337151 | 10/1983 | Fed. Rep. of Germany . |
| 3616227 | 11/1986 | Fed. Rep. of Germany . |
| 8524172 | 1/1987 | Fed. Rep. of Germany . |
| 3835972 | 10/1988 | Fed. Rep. of Germany . |
| 3843667 | 12/1988 | Fed. Rep. of Germany . |
| 1-136025 | of 1989 | Japan . |
| 2-147912 | of 1990 | Japan . |

Primary Examiner—Richard E. Chilcot, Jr.
Assistant Examiner—Elizabeth L. Dougherty
Attorney, Agent, or Firm—Antonelli, Terry, Stout & Kraus

[57] ABSTRACT

An electromagnetic flowmeter for measuring the flow rate of a fluid. The flowmeter has a measuring tube made of ceramics and defining a fluid passage therein for the fluid, electrodes having ends exposed to an interior of the measuring tube through holes which are formed in a wall of the measuring tube, a magnetic field generating device disposed around the electrodes, and a case encasing the measuring tube, the electrodes and the magnetic field generating means. A ratio t/R between a wall thickness t and a mean radius R of the measuring tube is determined such that stress generated in the measuring tube by the fluid in the measuring tube does not exceed the rupture stress of the measuring tube. The measuring tube can have flanges on both axial ends thereof, a radial height of the flange from an outer surface of the measuring tube is not greater than the wall thickness of the tube when the tube is made of $Al_2O_3$ and not greater than a value three times as large as the tube wall thickness when the tube is made of $Si_3N_4$. The electrodes may be made from Ni or an Ni alloy and are secured to the measuring tube by press-fitting into holes formed in the tube wall or by jointing. The electromagnetic flowmeter thus obtained exhibits high strength and reliability and high degree of gas-tightness in the tube portions around the electrodes.

12 Claims, 4 Drawing Sheets

ELECTROMAGNETIC FLOWMETER

BACKGROUND OF THE INVENTION

1. Field of the Invention

The present invention relates to an electromagnetic flowmeter of the type which has a measuring tube, electrodes formed on the measuring tube, a magnetic field generating means surrounding the electrodes and a case which encases the measuring tube, electrodes and the magnetic field generating means. More particularly, the present invention is concerned with an electromagnetic flowmeter which features a specific form of the measuring tube effective in improving resistance to thermal impact and a novel construction of the electrode portion which provides superior gas-tightness.

2. Description of the Related Art

An electromagnetic flowmeter is a device in which a magnetic field is perpendicularly applied to a conductive fluid flowing in a measuring tube so as to induce an electric current, whereby the flow rate of the fluid is measured by signals from electrodes which detect the induced electric current.

As discussed in a magazine MEASUREMENT AND CONTROL, Vol. 29, No. 9, pp. 27-34, a typical conventional electromagnetic flowmeter has a measuring tube which is made of a stainless steel or like material and which is lined at its inner side with an insulating lining material such as a natural rubber, synthetic rubber or a fluororesin. In recent years, measuring tubes are also broadly used which are made of non-conductive ceramics such as alumina (referring to as $Al_2O_3$ hereinafter), in order to acquire greater levels of resistance to heat, corrosion and wear. In the known measuring tube made of a stainless steel, electrodes are secured to the measuring tube by inserting the electrodes into holes formed in the tube wall and then fixing them by means of an adhesive so as to obtain gas-tightness. When $Al_2O_3$ is used as the tube material, electrodes associated with the tube are made of platinum which has sufficient resistance both to heat and corrosion at temperatures at which $Al_2O_3$ are suitably sintered. Such electrodes can be secured in a gas-tight manner to the tube by, for example, a method which is disclosed in the specification of WO 83/02000 (PCT/EP82/00097), wherein holes of the same diameter as the electrodes are formed in the wall of $Al_2O_3$ measuring tube before sintered, inserting the platinum electrodes into the holes and then sintering the $Al_2O_3$ tube and the electrodes thereby integrating them.

These known electromagnetic flowmeter were not designed with sufficient consideration of the necessity for reducing a temperature difference which is established by the flowing fluid during the measurement between the inner and outer surfaces of the measuring tube. Consequently, a risk has been encountered that the ceramics measuring tube may be cracked due to application of excessively large thermal stress. Ceramics measuring tubes, therefore, could not be used in plants in which large thermal stress is caused on the measuring tube. For the same reason, use of ceramics measuring tubes has been restrained from being used in such fields that handle deleterious matters.

In case of the measuring tubes made of stainless steel, it has been difficult to maintain gas-tightness for a long time because the electrodes are secured to the measuring tube simply by an adhesive. On the other hand, in the case of a ceramics measuring tube in which the electrodes are held by shrink fit due to shrinkage of tube after the sintering, unduly large thermal stress is generated in the portions of the ceramics measuring tube holding the electrodes, with the result that the strength of the ceramics measuring tube is impaired. Furthermore, any defect in the boundary between the measuring tube and the electrode causes a reduction in the gas-tightness. It is also to be noted that the ceramics measuring tube cannot stand for use in an environment where heat cycles are applied to the tube, because repetition of heat cycles undesirably reduces the shrink fit force with which the electrodes are held, with the result that the gas-tightness is lost before long.

SUMMARY OF THE INVENTION

Accordingly, an object of the present invention is to provide an electromagnetic flowmeter in which thermal stress caused in the measuring tube due to heat of the fluid flowing in the tube is minimized so as to provide improved durability.

Another object of the present invention is to provide an electromagnetic flowmeter having an electrode mounting structure which exhibits improved gas-tightness.

To these ends, according to the invention, there is provided an electromagnetic flowmeter for measuring the flow rate of a fluid, comprising a measuring tube made of ceramics and defining a fluid passage therein for the fluid, electrodes having ends exposed to the interior of the measuring tube through holes which are formed in the wall of the measuring tube, a magnetic field generating device disposed around the electrodes, and a case encasing the measuring tube, the electrodes and the magnetic field generating device, wherein the improvement comprises that the ratio t/R between the wall thickness t and the mean radius R of the measuring tube is determined such that the resultant stress generated in the measuring tube by the pressure and heat from the fluid in the measuring tube does not exceed the rupture stress of the measuring tube. Preferably, the value of the ratio t/R falls within the range between 0.1 and 0.2.

The measuring tube can have flanges on both axial ends thereof, the radial height of the flange from the outer surface of the measuring tube is not greater than the wall thickness of the tube when the tube is made of $Al_2O_3$ and not greater than a value three times as large as the tube wall thickness when the tube is made of silicon nitride (referred to as $Si_3N_4$ hereinafter).

The measuring tube may be made from $Si_3N_4$ or an engineering plastic having superior resistance to thermal impact, whereby the measuring tube can withstand greater level of thermal stress, thus exhibiting improved reliability.

The thermal stress caused in the measuring tube by the temperature differential between the inner and outer surfaces of the measuring tube can be reduced also by means of a heater provided on the outer surface of the measuring tube or embedded in the measuring tube wall.

A high degree of gas-tightness at the areas around the electrodes can be attained by using Ni or an Ni alloy as the electrode material and press-fitting the electrodes in through holes formed in the wall of the measuring tube or by joining, e.g., by brazing.

Thus, according to the invention, the ratio t/R between the wall thickness t and the mean radius R of the measuring tube is determined such that the resultant stress generated in the measuring tube by the heat and pressure from the fluid in the measuring tube does not exceed the rupture stress of the measuring tube. The measuring tube, therefore, exhibits a high level of rigidity to withstand any force produced by the pressure of the fluid flowing therein and can operate with improved reliability because the level of the thermal stress is lowered.

When flanges are provided on both axial ends of the measuring tube, the strength and reliability of the measuring tube are ensured by elimination of concentration of thermal stress to the base portions of the flanges by virtue of the fact that the radial height of the flange from the outer surface of the measuring tube is not greater than the wall thickness of the tube when the tube is made of $Al_2O_3$ and not greater than a value three times as large as the tube wall thickness when the tube is made of $Si_3N_4$.

The use of $Si_3N_4$ or engineering plastic superior in resistance to thermal impact, when used as the material of the measuring tube, enables the measuring tube to withstand greater thermal stress, thus contributing also to improvement in the reliability of the measuring tube, adapting the flowmeter to measurement of fluids of higher temperatures.

When the measuring tube is provided with a heater on the outer surface or embedded in the wall thereof, it is possible to reduce the temperature differential between the inner and outer surfaces of the measuring tube. Consequently, the thermal stress created in the measuring tube is reduced even when a fluid of a high temperature is abruptly introduced into the measuring tube. Consequently, strength and reliability of the measuring tube are improved particularly when the measuring tube experiences a large change in the internal fluid temperature. This enables the flowmeter to be used in plants which handle fluids of high temperatures.

In a preferred form of the invention, the electrodes are made of Ni or an Ni alloy and are secured to the measuring tube by being press-fitted into holes formed in the wall of the measuring tube or by jointing. Consequently, the electrodes are secured to the measuring tube with high degree of gas-tightness. When the electrodes are secured by jointing, generation of excessive stress in the measuring tube is prevented.

The above and other objects, features and advantages of the present invention will become clear from the following description of the preferred embodiments when the same is read in conjunction with the accompanying drawings.

DESCRIPTION OF THE PREFERRED EMBODIMENT

Figure 1:
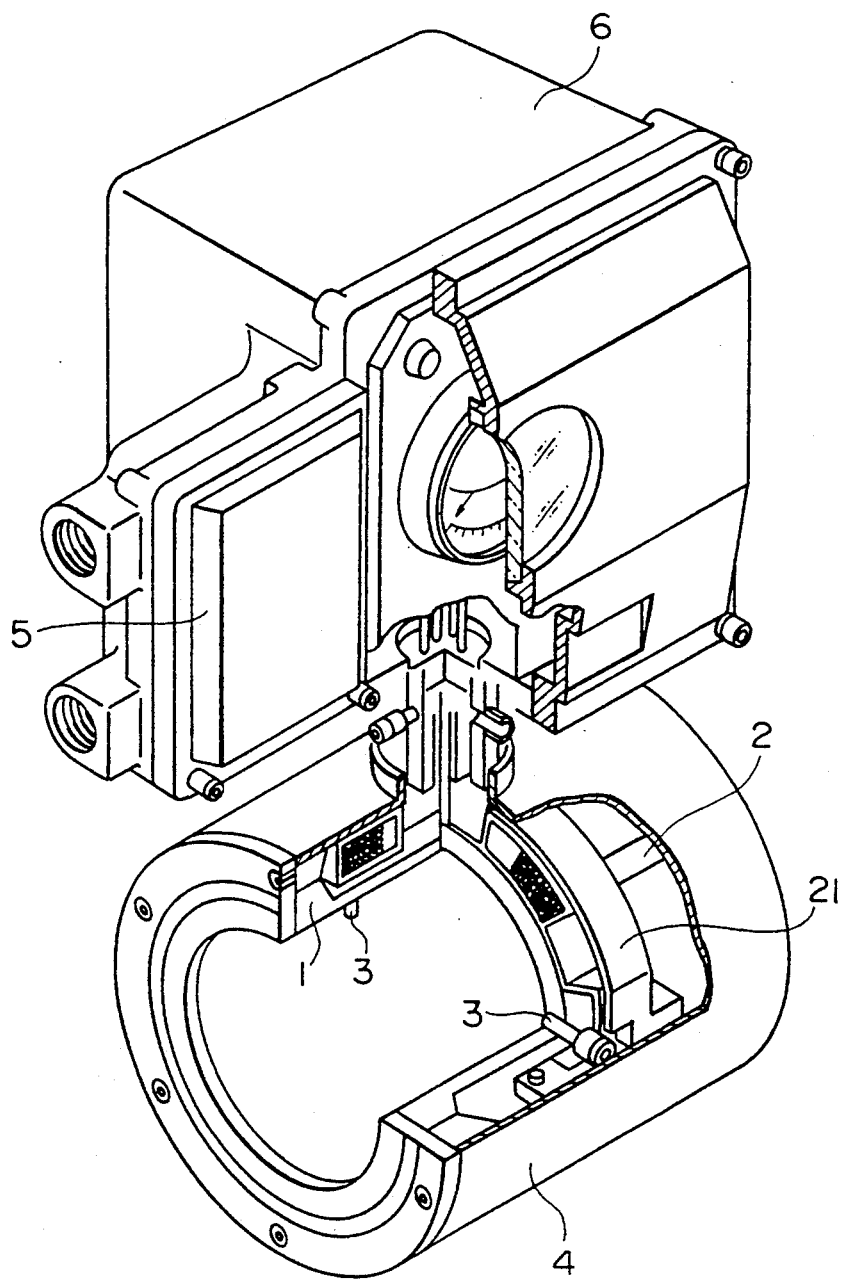
FIG. 1 is a perspective view of a first embodiment of the electromagnetic flowmeter of the present invention.
Figures 2A, 2B:
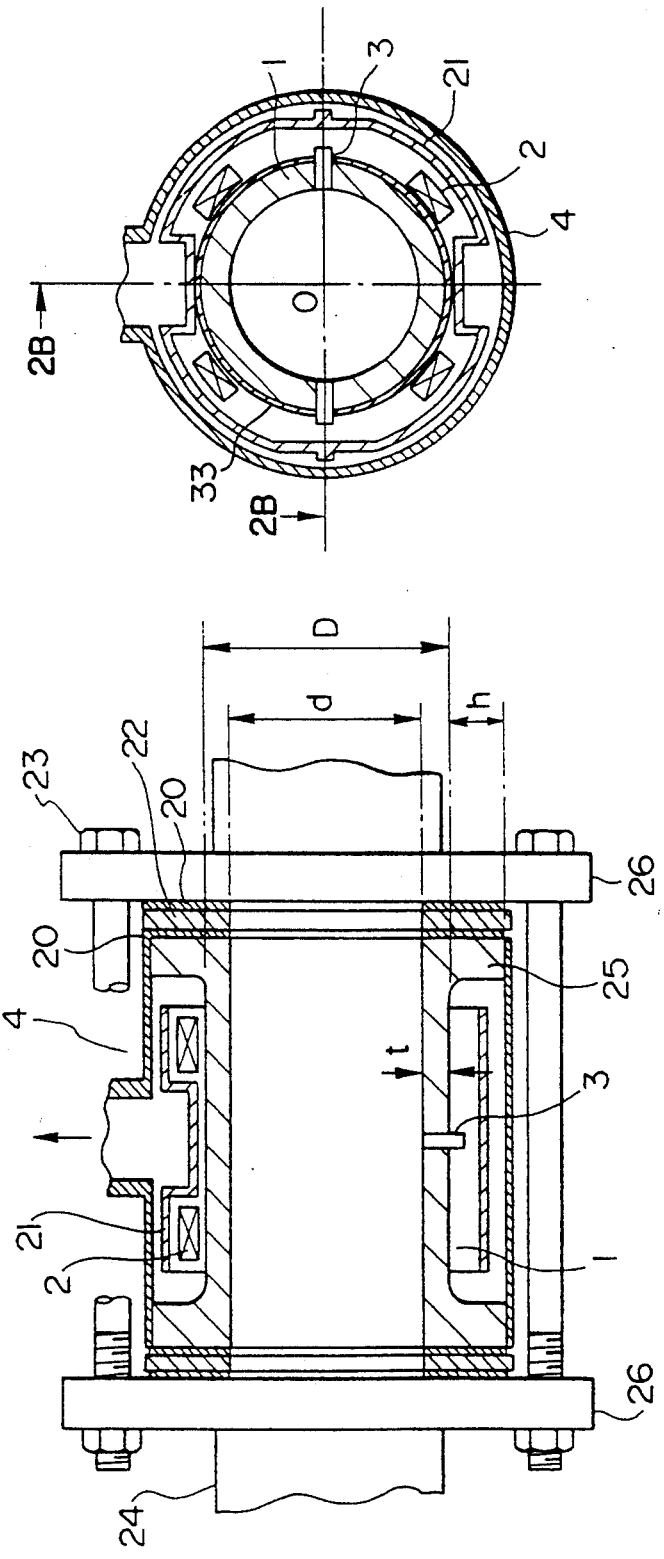
FIGS. 2A and 2B are sectional views of a measuring tube incorporated in the first embodiment.

Electromagnetic flowmeters as preferred embodiments of the present invention will be described with reference to FIGS. 1 to 6, as well as to Table 1. FIG. 1 is partly-sectioned perspective view of the electromagnetic flowmeter as the preferred embodiment, while FIG. 2A is a cross-sectional view of a cylindrical portion of the flowmeter having an exciting coil, a case of the like, taken along a plane perpendicular to the axis of the cylindrical portion and FIG. 2B is an axial sectional view of the same portion taken along the line 2B-O-2B.

The electromagnetic flowmeter of this embodiment has a substantially cylindrical measuring tube 1 defining therein a passage for a fluid, a pair of electrodes 3 having ends exposed to the interior of the tube through holes which are formed in the wall of the measuring tube 1, an excitation coil 2 surrounding the electrode and serving as a magnetic field generating portion, a core 21 covering the excitation coil 2, a case 4 which accommodates the measuring tube 1, electrodes 3, excitation coil 2 and the core 21, and a terminal box 5 through which signals from the electrodes 3 are delivered to a transducer 6. The excitation coil 2 as the magnetic field generating portion applies a magnetic field to the fluid flowing in the measuring tube 1, while the pair of electrodes 3 detects electromotive force across the fluid under the influence of the magnetic field.

In this embodiment, the measuring tube 1 is made of $Si_3N_4$. A flange of a height h is formed on the outer periphery of each longitudinal end of the measuring tube 1. The flange is substantially flush with a thick-walled portion (thickness t) of each end surface of the measuring tube 1. These flush surfaces are perpendicular to the longitudinal axis of the measuring tube 1.

The measuring tube 1 is so designed that the ratio t/R, between the thickness t and the mean radius R which is half the mean diameter Dr of the principal outside and inside diameters D and d, falls within the range between 0.1 and 0.2. The flange height h is determined to be 2t. Thus, the mean diameter Dr, mean radius R and the wall thickness t are determined to meet the following conditions:

Dr=(D+d)/2
R=Dr/2
t=(D−d)/2

As shown in FIG. 2A, a heater 33 is disposed to surround the measuring tube 1 so as to heat the measuring tube 1 to a temperature substantially the same as that of the fluid flowing in the measuring tube 1.

Figure 5:
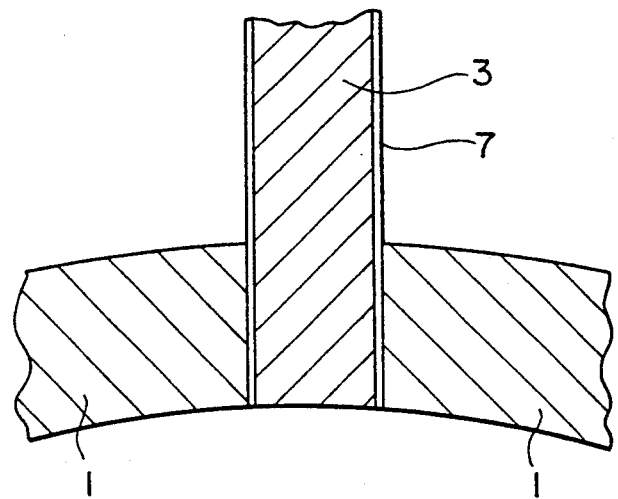
FIG. 5 is a sectional view of the first embodiment illustrating particularly the state of mounting of an electrode.

FIG. 5 illustrates the manner in which the electrodes 3 are mounted. In the illustrated embodiment, through-holes of 1.55 mm diameter are formed in the wall of the measuring tube 1 substantially at longitudinal (axially) midst of the tube. Each through hole receives the electrode 3 which, in this case, in made of stainless steel SUS 316 of 1.55 mm dia. plated at its surface with Ni—P plating layer 7 of 20 μm thick, such that the end of the electrode 3 is exposed in the inner peripheral surface of the measuring tube 1. The measuring tube 1, with the electrodes 3 secured thereto, has been heated in a furnace in which vacuum degree is $10^{-1}$ Pa to 900° C. so that the electrodes 3 have been firmly secured to the measuring tube 1. The measuring tube 1 having the electrodes 3 thus fixed thereto was subjected to an examination of gas-tightness which was conducted by using a He leak detector. The amount of leaked gas was smaller than the minimum amount ($10^{-10}$ Torr. l/s) sensible by the He leak detector, thus proving quite a high degree of gas-tightness of the measuring tube 1. The measuring tube also was subjected to a thermal cycle test in which 100 heat cycles each consisting of heating from 20° C. to 180° C. and cooling from 180° C. to 20° C. were applied to the measuring tube 1. No reduction in the gas-tightness was observed even after application of 100 heat cycles.

Referring to FIGS. 2A and 2B, the electromagnetic flowmeter of the type described is incorporated in a process line pipe 24. More specifically, both axial ends of the flowmeter are connected to flanges 26 on the end surfaces of opposing segments of the pipe 24 via gaskets 20 and earth rings 22 by means of bolts 23.

Figure 3:
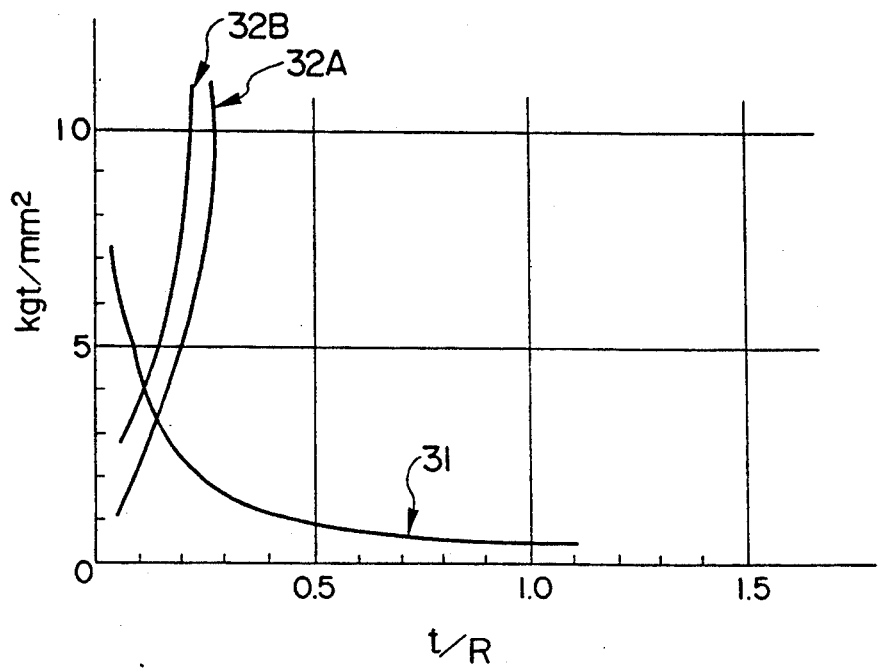
FIG. 3 is a graph showing the relationship between t/R factor of the measuring tube and stress occurring in the tube.

The aforementioned preferred value of the ratio between the thickness t and the mean radius R has been determined on the basis of the results of an FEM analysis and measurement of stress of the measuring tube 1. The ground for the determination of the preferred range of this ratio will be explained with reference to FIG. 3 in which the axis of abscissa represents the ratio t/R, while the axis of ordinate indicates the stress $\sigma$ generated in the measuring tube. In FIG. 3, a curve 31 indicates the relationship between the ratio t/R of $Al_2O_3$ measuring tube having inside and outside diameters d and D of 50 mm and 75 mm and circumferential stress caused in the measuring tube, as observed when internal pressure of 0.4 kgf/mm$^2$ is applied to the measuring tube 1. Curves 32A and 32B show, respectively, the relationships between the ratio t/R and the maximum axial and circumferential stresses as observed when a fluid of temperature 180° C. and pressure 0.4 kgf/mm$^2$ flows at a velocity of 2 m/sec in measuring tubes which have inside diameters of 50 mm and 75 mm and which are held at 20° C. From this Figure, it will be seen that the axial and circumferential stresses in the measuring tube 1 drastically increase when the ratio t/R exceeds 0.2. It will also be understood that the circumferential stress rapidly increases due to the internal pressure when the ratio t/R is below 0.1. In this embodiment, the measuring tube 1 was cracked due to thermal stress when the ratio t/R exceeded 0.2, and the measuring tube was ruptured by the internal pressure when the ratio was below 0.1. The crack due to thermal stress typically appeared in the radial direction in the region near the flange on the fluid inlet side of the tube, while the crack due to pressure typically appeared axially in the thick-walled part (t) of the measuring tube. It was confirmed that no crack is formed so that the measurement can stably be conducted when the ratio t/R of the measuring tube 1 range from 0.1 to 0.2. A similar experiment was conducted by using a measuring tube 1 of $Al_2O_3$ having an inside diameter of 100 mm and a ratio t/R of 0.1. No cracking of the measuring tube 1 was found also in this case, thus ensuring that the measurement can be conducted safely. Thus, the electromagnetic flowmeter of the present invention offers a remarkable improvement both in strength and reliability.

Figure 4:
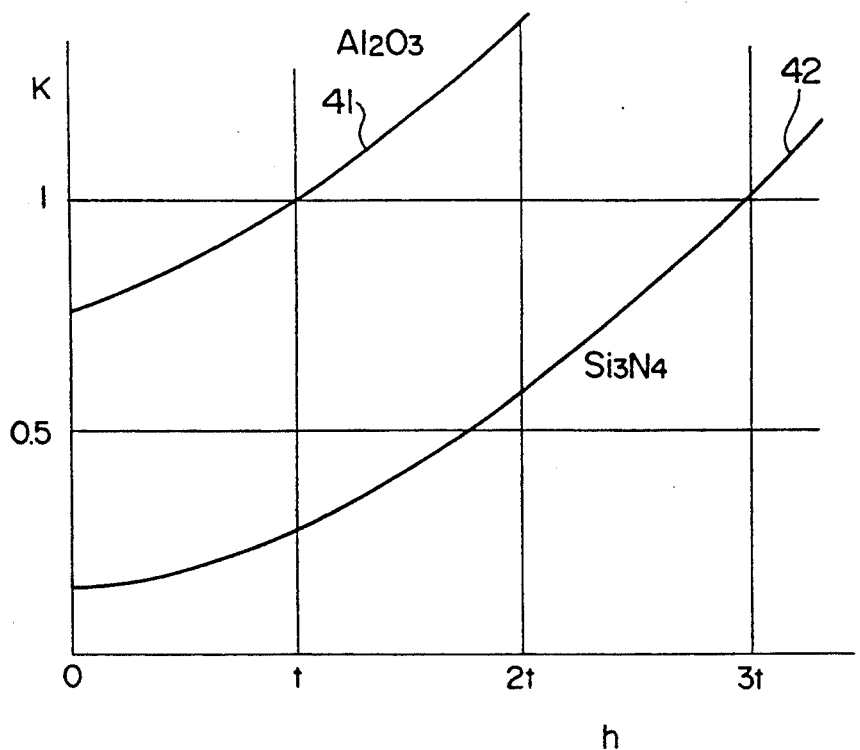
FIG. 4 is a graph showing the relationship between the height h of the flange of the measuring tube and the normalized stress ratio K.

FIG. 4 is a graph showing the relationship between flange height h and normalized stress ratio K (ratio of thermal stress to rupture stress), as observed in a second embodiment of the electromagnetic flowmeter of the present invention. More specifically, a curve 41 shows the above-mentioned relationship between the flange height h and the normalized stress ratio K as observed in measuring tubes 1 made of $Al_2O_3$ and having diameters D of 60 mm and 80 mm and thickness t of 5 mm and 6.5 mm. Similarly, a curve 42 shows the above-mentioned relationship as observed with measuring tubes 1 made of $Si_3N_4$ and having diameters D of 60 mm and 80 mm and thickness t of 5 mm and 6.5 mm. These curves were obtained by plotting values which were calculated through FEM analysis method in a non-steady condition on an assumption that a fluid of temperature 180° C. and pressure 0.4 kgf/mm$^2$ flowed at a velocity of 2 m/s in the measuring tube 1 while the latter was held at 20° C. The curve 41 and 42 respectively show that, provided that the same measuring tube material is used, the relationship between the flange height h in terms of a multiple of the thickness t and the normalized stress ratio K is substantially the same regardless of any difference in the tube diameter and thickness. From FIG. 4, it is understood that rupture of the tube does not occur when the flange height h of the measuring tube 1 made of $Al_2O_3$ is below the wall thickness t. It is also understood that, in case of the measuring tube 1 made of $Si_3N_4$, the tube can be used without risk of rupture when the flange height h is not greater than 3 t.

With this knowledge, test measuring tubes were prepared from $Al_2O_3$ and $Si_3N_4$, respectively, wherein the flange height h was varied between 0.5 t and 1.5 t in the case of the $Al_2O_3$ tubes and between 1 t and 4 t in the case of the $Si_3N_4$ tubes. These measuring tubes were subjected to a test under the aforementioned FEM analysis conditions. $Al_2O_3$ measuring tubes 1 having flange heights h not smaller than t were ruptured, whereas $Al_2O_3$ measuring tubes 1 having smaller flange heights could safely be used. In case of the measuring tubes 1 made of $Si_3N_4$, rupture were observed when the flange heights h exceeded 3 t but no rupture was found when the flange heights were 3 t or less. It is thus understood that the strength and reliability of the electromagnetic flowmeter are improved to ensure safe and stable measurement when the flange heights h are not greater than t and 3 t, respectively, when $Al_2O_3$ and $Si_3N_4$ are used as the material of the measuring tube 1.

A description will now be given of a third embodiment. Electromagnetic flowmeters having measuring tubes 1 made of $Si_3N_4$ were subjected to an experiment conducted for the purpose of examining thermal impact resistance of the measuring tube. The measuring tubes employed in this embodiment had a diameter D of 60 mm and a wall thickness t of 5 mm. The ratio t/R was 0.18. Unlike the measuring tubes in the preceding embodiments, the measuring tubes in the third embodiment were devoid of the flanges on both axial ends. Thus, the measuring tube 1 had a constant cross-sectional shape over the entire length thereof. The measuring tube made of $Si_3N_4$ was uniformly heated to 220° C. and water of 20° C. was circulated through this tube 1. The entire surface of the measuring tube 1 was examined but no crack was found. Measuring tubes of the same size and configuration as those of the above-mentioned $Si_3N_4$ measuring tubes were prepared from $Al_2O_3$ and tested under the same conditions as above. In this case, cracks were generated in the measuring tubes 1. This is attributed to the facts that $Si_3N_4$ exhibits, as compared with $Al_2O_3$, smaller values of coefficient of linear expansion and modulus of longitudinal elasticity and, hence, small thermal stress is resulted, although flexural strength is greater, as shown in the following Table 1.

TABLE 1

| Item | Material | |
|---|---|---|
| | $Al_2O_3$ | $Si_3N_4$ |
| Modulus of longitudinal elasticity (kgf/mm$^2$) | 37000 | 33000 |
| Coefficient of linear expansion (/°C.) | $7 \times 10^{-6}$ | $2.6 \times 10^{-6}$ |
| Thermal conductivity (kcal/mm · s °C.) | 0.06 | 0.04 |
| Flexural strength (kgf/mm$^2$) | 33 | 33 |

It is thus possible to obtain a highly reliable electromagnetic flowmeter by using, as the material of the measuring tube, $Si_3N_4$ which has such properties as to reduce thermal stress occurring in the measuring tube 1, as well as high strength. Similar advantage can be obtained also when the measuring tube 1 is made of a material such as $ZrO_2$ or engineering plastics.

A description will now be given of a fourth embodiment. The fourth embodiment employs a measuring tube 1 made of $Si_3N_4$ and having the same configuration as that employed in the third embodiment. The fourth embodiment of the flowmeter of the present invention was produced by preparing a blank of the $Si_3N_4$ measuring tube, forming through holes of 1.55 mm diameter to penetrate the tube wall substantially at the axial or longitudinal mid portion of the tube blank, inserting electrodes 3 made of Ni steel and having a diameter of 1.5 mm into the through holes, and heating the tube blank together with the electrodes 3 within an oven at 850° C. for 10 minutes under a reduced pressure of $10^{-3}$ Pa, thus integrating the electrodes 3 with the tube 1. In order to confirm the gas-tightness of the thus-produced measuring tube, a leak test was conducted by means of a He leak detector. An amount of the leak was below the minimum amount ($10^{-10}$ Torr·l/s) sensible by the He leak detector, thus indicating a high degree of gas-tightness. The portions of the electrodes 3 contactable with the fluid may be coated by a suitable material, in order to improve corrosion resistance of the electrodes 3.

It is also possible to compose each electrode 3 from two parts: a first part which do not come into contact with the fluid and which is secured to the measuring tube 1 in the same method as the first embodiment or fifth embodiment which will be described later, and a second part contactable with the fluid and made of a corrosion resistance material and suitably connected to the first part by, for example, press fitting. Although Ni steel is used as the electrode material in this embodiment, this is only illustrative and the electrode may be formed from a material other than the nickel steel, e.g., nickel, a nickel alloy different from nickel steel or a nickel-plated metallic material. It is also possible to secure the electrodes to the measuring pipe by brazing. Preferably, when the electrodes are secured by brazing, a metallic layer is formed on the joint surfaces of each through-hole for receiving the electrode, by flame spraying or vapor deposition of a metal.

The fifth embodiment of the electromagnetic flowmeter of the present invention employs a measuring tube 1 of the same configuration as that used in the third embodiment and made from $Si_3N_4$.

In the fifth embodiment, the through holes of 1.55 mm diameter formed substantially at the axial midst portion of the measuring tube blank were first charged with powder of sialon which is electrically conductive, and the measuring tube blank was heated at 1750° C. in a nitrogen atmosphere so that the sialon was sintered together with the tube blank to become integral therewith. After the sintering, a T-Cu-Ag type solder was applied to the surface of the sialon, followed by heating in an oven at 900° C. Thereafter, lead wire was soldered to the Ti-Cu-Ag solder surface, thus forming the electrode. An amount of leakage was measured in the same way as that described before using He leak tester. The amount of leak was below the minimum amount sensible by the He leak tester, thus proving high degree of gas-tightness.

In the embodiments described hereinbefore, the end of each electrode 3 is exposed to the interior of the measuring tube 1. This, however, is not exclusive and the through hole for receiving the electrode may be substituted by a blind hole which terminates midway of the thickness of the measuring tube wall. In such a case, the end of the electrode is positioned within the thickness of the measuring tube wall, rather than being exposed to the interior of the measuring tube. It is even possible to provide each electrode on the outer surface of the measuring tube wall, without necessitating any hole formed in the measuring tube wall. Obviously, elimination of through holes reduces or completely avoid leakage of the internal fluid from the areas around the electrodes, thus offering higher degree of reliability of the flowmeter.

Figure 6:
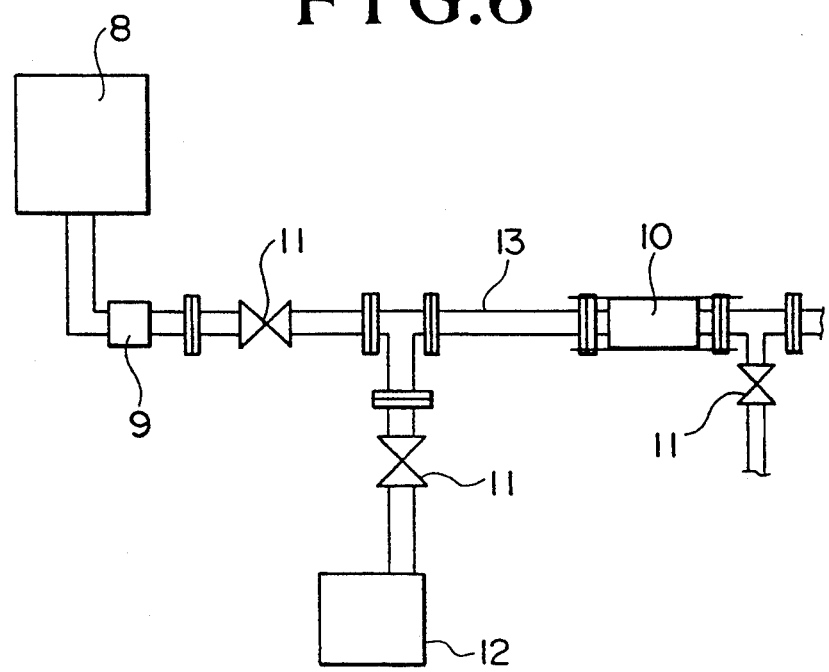
FIG. 6 is a piping arrangement in a food producing plant which uses the electromagnetic flowmeter of the present invention.

FIG. 6 shows a sixth embodiment of the electromagnetic flowmeter of the present invention. This flowmeter has a measuring tube 1 made of $Si_3N_4$ and having a diameter D of 60 mm and a wall thickness t of 5 mm, with the ratio t/R set to 0.18, having electrodes 3 secured thereto by the same method as the used in the first embodiment. The electromagnetic flowmeter thus formed, generally denoted by 10, is connected in a production line pipe of a food production plant. The plant has a tank 8 accommodating a food in the form of an aqueous solution, a pump 9 connected to the tank 8 and adapted for pumping the food to a pipe 13, the electromagnetic flowmeter 10 inserted in a portion of the pipe 3 and adapted for measuring the flow rate of the food in the pipe 13, a boiler 12 connected in the portion of the pipe between the pump 9 and the flowmeter 10 and adapted for supplying sterilization steam into the pipe, and a valve 11 disposed in a pipe through which the boiler 12 is connected to the pipe 3. Thus, the food in the form of a fluid of a normal temperature and the sterilization steam of temperature 180° C. and pressure 0.4 kgf/mm$^2$ are alternately supplied to the electromagnetic flowmeter 10 of the invention. It was confirmed that the flowmeter 10 can measure the flow rate at a high degree of accuracy without any cracking of the measuring tube 1 and without suffering from reduction in the gas-tightness due to leak through the electrode portions, even under such a condition of use. The electromagnetic flowmeter of the present invention can be used not only in food production plant described but also in other types of plants such as chemical plants, as well as running water and sewage plants.

Although $Al_2O_3$ and $Si_3N_4$ are specifically mentioned as the materials of the measuring tube, these materials are not exclusive and various other materials such as SiC, zirconia and sialon can be used equally well.

In the first embodiment as described, the heater is disposed to surround the measuring tube 1. The heater, however, may be placed on the inner surface of the blank of the measuring tube 1 or may be embedded in the wall of the measuring tube 1 during the sintering so as to be integrated with the measuring tube 1 by the sintering. As the material of such a heater, thin wires of tantalum have been considered. Positioning of the heater inside the measuring tube can avoid advantageously any risk of physical interference between the heater and the exciting coil which may otherwise be caused when the heater is disposed outside the measuring tube.

As will be understood from the foregoing description, according to the present invention, it is possible to reduce thermal stress occurring in the measuring tube due to temperature differential between the inner and outer surfaces of this tube. Consequently, strength and reliability of the measuring tube are improved to offer a higher degree of reliability of the electromagnetic flowmeter. Furthermore, since the measuring tube is made of a material which excels in resistance to thermal impact, the electromagnetic flowmeter of the present invention can safely and reliably be used even in the cases where heavy thermal load is applied to the measuring tube.

It is also to be understood that, according to the present invention, the electrodes can be connected to the measuring tube simply by press-fitting or jointing, without imparting excessive stress to the measuring tube, thus ensuring high degree of gas-tightness in the areas around the electrodes, contributing also to improvement in the reliability of the flowmeter.

What is claimed is:

1. An electromagnetic flowmeter for measuring the flow rate of a fluid, comprising: a measuring tube made of ceramics and defining a fluid passage therein for said fluid; electrodes having ends exposed to an interior of said measuring tube through holes which are formed in a wall of said measuring tube; means for generating a magnetic field disposed around said electrodes; and a case encasing said measuring tube, said electrodes and said magnetic field generating means; wherein a ratio t/R between a wall thickness t and a mean radius R of said measuring tube is determined to range from 0.1 to 0.2.

2. An electromagnetic flowmeter according to claim 1, wherein said electrodes are located substantially at an axial mid portion of said measuring tube.

3. An electromagnetic flowmeter according to claim 1, wherein said measuring tube is made of $Al_2O_3$ and is provided on both ends thereof with flanges having a height, as measured from an outer surface of said measuring tube, of not greater than a wall thickness of said measuring tube.

4. An electromagnetic flowmeter according to claim 1, wherein said measuring tube is made if $Si_3N_4$ and is provided on both ends thereof with flanges having a height, as measured from an outer surface of said measuring tube of not greater than a value which is three times as large as the wall thickness of said measuring tube.

5. An electromagnetic flowmeter for measuring the flow rate of a fluid, comprising: a measuring tube made of ceramics and defining a fluid passage therein for said fluid; electrodes having ends located within a thickness of a wall of said measuring tube; means for generating a magnetic field disposed around said electrodes; and a case encasing said measuring tube, said electrodes and said magnetic field generating means; wherein a ratio t/R between a wall thickness t and a mean radius R of said measuring tube is determined to range from 0.1 to 0.2.

6. An electromagnetic flowmeter according to claim 5, wherein said electrodes are located substantially at an axial mid portion of said measuring tube.

7. An electromagnetic flowmeter according to claim 5, wherein said measuring tube is made of $Al_2O_3$ and is provided on both ends thereof with flanges having a height, as measured from an outer surface of said measuring tube, of not greater than a wall thickness of said measuring tube.

8. An electromagnetic flowmeter according to claim 5, wherein said measuring tube is made of $Si_3N_4$ and is provided on both ends thereof with flanges having a height, as measured from an outer surface of said measuring tube, of not greater than a value which is three times as large as the wall thickness of said measuring tube.

9. An electromagnetic flowmeter for measuring the flow rate of a fluid, comprising: a measuring tube defining a fluid passage therein for said fluid; electrodes provided on an outer surface of a wall of said measuring tube; means for generating a magnetic field disposed around said electrodes; and a case encasing said measuring tube, said electrodes and said magnetic field generating means; wherein a ratio t/R between a wall thickness t and a mean radius R of said measuring tube is determined to range from 0.1 to 0.2.

10. An electromagnetic flowmeter according to claim 9, wherein said electrodes are located substantially at an axial mid portion of said measuring tube.

11. An electromagnetic flowmeter according to claim 9, wherein said measuring tube is made of $Al_2O_3$ and is provided on both ends thereof with flanges having a height, as measured from an outer surface of said measuring tube, of not greater than a wall thickness of said measuring tube.

12. An electromagnetic flowmeter according to claim 9, wherein said measuring tube is made of $Si_3N_4$ and is provided on both ends thereof with flanges having a height, as measured from an outer surface of said measuring tube, of not greater than a value which is three times as large as the wall thickness of said measuring tube.

* * * * *